(12) United States Patent
Coffey et al.

(10) Patent No.: US 10,596,658 B1
(45) Date of Patent: Mar. 24, 2020

(54) FRICTION STIR WELDING TOOL AND RELATED METHODS

(71) Applicant: Seagate Technology LLC, Cupertino, CA (US)

(72) Inventors: Jerome Thomas Coffey, Boulder, CO (US); Jeffrey L. Bruce, Longmont, CO (US); Jason W. Morris, Longmont, CO (US); Matthew Alexander Chamot, Thornton, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 11 days.

(21) Appl. No.: 15/908,160

(22) Filed: Feb. 28, 2018

(51) Int. Cl.
| | |
|---|---|
| *B23K 20/00* | (2006.01) |
| *B23K 20/12* | (2006.01) |
| *C22C 38/52* | (2006.01) |
| *C22C 38/50* | (2006.01) |
| *C22C 38/02* | (2006.01) |
| *C22C 38/24* | (2006.01) |
| *C22C 38/22* | (2006.01) |
| *C22C 38/30* | (2006.01) |

(52) U.S. Cl.
CPC .......... *B23K 20/1255* (2013.01); *C22C 38/02* (2013.01); *C22C 38/22* (2013.01); *C22C 38/24* (2013.01); *C22C 38/30* (2013.01); *C22C 38/50* (2013.01); *C22C 38/52* (2013.01)

(58) Field of Classification Search
CPC ............ B23K 20/1255; B23K 20/1245; B23K 20/122; B23K 20/123; B23K 20/1225
See application file for complete search history.

(56) References Cited

U.S. PATENT DOCUMENTS

| | | | | |
|---|---|---|---|---|
| 8,279,552 | B2 | 10/2012 | Stipe | |
| 9,536,572 | B2 | 1/2017 | Lapp et al. | |
| 2004/0079787 | A1* | 4/2004 | Okamoto | B23K 20/125 228/112.1 |
| 2006/0289608 | A1* | 12/2006 | Steel | B23K 20/1255 228/101 |
| 2014/0119814 | A1* | 5/2014 | Osikowicz | B23K 20/1255 403/270 |
| 2014/0166731 | A1* | 6/2014 | Seo | B23K 20/122 228/112.1 |

OTHER PUBLICATIONS

Diehl Tool Steel (http://www.diehlsteel.com/products/cpm-powder-metal/cpm-10v, Sep. 27, 2016 from wayback.org) (Year: 2016).*
Zhang et al., "Review of tools for friction stir welding and processing" Canadian Metallurgical Quarterly, vol. 51, No. 3. (2012) DOI 10.1179/1879139512Y.0000000015, pp. 250-261.

* cited by examiner

*Primary Examiner* — Erin B Saad
(74) *Attorney, Agent, or Firm* — Kagan Binder, PLLC

(57) ABSTRACT

Described are enclosures that include a friction stir weld, including electronic device enclosures, and precursors thereof, that contain a base and a cover that in an assembled condition form a joint at which a friction stir weld can be produced, as well as methods for producing a friction stir weld at a joint of such an assembly.

13 Claims, 6 Drawing Sheets

FRICTION STIR WELDING TOOL AND RELATED METHODS

FIELD

The invention relates to tools useful to produce a friction stir weld, methods of forming a friction stir weld, and assemblies such as (but not limited to) electronic devices that include a friction stir weld.

BACKGROUND

Friction stir welding is a method useful for joining together two separate metal pieces by way of a strong, permanent metallic bond (i.e., weld). The method involves rotating a friction stir welding tool at high speed and contacting the tool, with pressure, at a joint formed between edges of the metal pieces. Mechanical stirring and frictional heat introduced into the material at the joint by the rotating tool form the weld. A lengthwise joint is produced by moving the rotating tool along the joint.

Friction stir welding can be useful in manufacturing a metal product that includes two adjacent metal pieces that form a joint that requires a weld. As a single non-limiting example, friction stir welding may be useful for manufacturing electronic devices such as data storage devices (e.g., hard disk drives or HDDs). To increase reliability of certain types of electronic devices, their components may be placed within a metal enclosure that can be closed or sealed to prevent undesired moisture, gases, or particulates from contacting these components. The enclosure may preferably be hermetically sealed to create a compositionally stable interior atmosphere and to prevent gases from entering or exiting the interior. Enclosures of some hermetically-sealed electronic devices (e.g., hard disk drives) are filled with a non-air atmosphere, for example a low density atmosphere (e.g., helium), as a way to improve device performance. There are various benefits to operating a hard disk drive in a low density atmosphere. A low density atmosphere (relative to air, e.g., a helium atmosphere) in a hard disk drive can reduce the amount of drag force that affects a spinning disk or a stack of closely-spaced spinning disks. The reduced amount of drag can significantly reduce the amount of power required to cause the stack of disks to spin. Also, a low density atmosphere can reduce the amount of un-wanted, non-rotational movement or "flutter" that can occur in a spinning disk and a disk suspension during use. Reducing un-wanted motion of a disk or disk suspension can allow adjacent disks of a disk stack to be placed more closely together, which increases areal density (a measure of the quantity of information bits that can be stored on a given area of disk surface) by enabling a narrower data track pitch. Efficient thermal conduction of helium can also allow for a reduced operating temperature of a device, and a lower density gas (relative to air) can produce less acoustic noise. The reliability of a hard disk drive that contains helium in a hermetically sealed enclosure can also be increased due to a reduced level of humidity at the drive interior, due to elimination of other gases and contaminants such as corrosive gases, and due to a reduced sensitivity of the atmosphere to altitude and external pressure variations.

More generally, friction stir welding is useful for many purposes in addition to the manufacture of sealed enclosures of electronic devices. On a commercial scale, for friction stir welding to be a method of choice for welding two metal pieces together, the friction stir welding process must be efficient, cost-effective, reliable, and must produce a high quality weld that is strong and aesthetically suitable, meaning that the weld finish is smooth and preferably burr free. When the weld is produced on a hermetically sealed enclosure, the weld must be highly impermeable to gases. Manufacturers that require methods for welding two metal pieces together are in ongoing pursuit of new and improved welding tools and welding methods.

SUMMARY

Friction stir welding is a technique that is known to be useful in various applications for welding metals. See for example U.S. Pat. Nos. 8,016,179 and 9,536,572, the entireties of these documents being incorporated herein by reference. Friction stir welding techniques, however, are known to have certain operational limits, and are understood to be not necessarily effective or efficient for every situation where a weld between two separate metal pieces is required.

Applicant's research in the area of friction stir welding techniques has led Applicant to identify methods and devices that can be used to successfully weld, by friction stir welding methods, a metal base and a metal cover of an electronics enclosure such as an enclosure of a hard disk drive. Applicant's research, for example, has led to designs of useful and advantageous friction stir welding tools, useful and advantageous welding conditions and operating parameters, and useful and advantageous cover and base configurations.

In example friction stir welding methods of the present description, two opposed metal pieces that form an enclosure that includes a shoulder joint where the two metal pieces meet, can be welded at the joint by a friction stir weld method. The two metal pieces include one piece that is a cover and one piece that is a base. The base has a vertically-extending sidewall that includes a shoulder at an outer surface of the sidewall between a top and a bottom of the sidewall. The cover includes a top planar portion and a vertically-extending lip that extends downward from the perimeter of the cover. When the cover is placed over the base, the lip extends along the outer surface of the sidewall of the base and a lip end portion contacts the shoulder of the sidewall to form a joint.

The friction stir welding step uses a friction stir weld tool that is rotated at high speed, pressed against the joint, and moved along the joint to form the friction stir weld. The rotating tool in contact with the base and cover materials at the joint generates heat through the axially-applied load. The amount of heat is not enough to melt the materials of the cover and base, but is enough to soften the materials so that the structure of the tool, by rotational movement, can mix the materials from the cover and the base together and form a welded joint.

The tool material is necessarily harder and more wear resistant than the materials of the cover and the base that are being joined. In a commercial, volume-based production setting, the tool wear life contributes to production cost and machine down-time for tool change out. A longer wearing tool reduces machine down-time, which can reduce production costs. That savings must of course be compared to any increase in a price of a longer-wearing tool.

The wear performance of a friction stir weld tool can depend on many factors taken together, such as features of the tool (e.g., its physical shape and size); friction stir weld conditions (e.g., rotational speed, downforce, translational speed); the composition of the materials of a workpiece; and the form of the workpiece; among other factors. One might assume that material properties of an alloy used in a friction stir welding tool, such as hardness, red hardness, and general characterizations of "wear resistance," should be helpful in identifying alloys that would exhibit good wear resistance in a friction stir weld tool. But Applicant has determined that such general factors are not necessarily predictive of wear resistance of an alloy used as a friction stir welding tool, e.g., when used in specific (high speed) friction stir weld conditions and with specific workpieces (aluminum hard disk drive assemblies) as described herein. The precise mechanism of wear during friction stir welding is not understood well enough to be accurately predicted or modeled.

For joining aluminum, a common material for a friction stir weld tool (i.e., a "pin tool") is H13 tool steel. Other alloys are known for use in bits and cutting tools, but previous uses of those alloys have not included as a friction stir weld tool (to Applicant's present knowledge). And, as discovered by Applicant, the general usefulness and wear resistance of alloys otherwise used in bits and cutting tools, when used in a friction stir welding tool, are highly varied. Alloys that include amounts of vanadium, tungsten, cobalt, molybdenum, and nickel, are commonly expected to have good wear resistance. Also, a higher hardness property of an alloy may be considered to predict high wear resistance. But Applicant has determined that these factors are not necessarily predictive of good wear resistance in a friction stir welding tool. Moreover, technical information relating to hardness and wear resistance of alloys is not standardized, and wear resistance of an alloy described in terms of a cutting tool (for example) may be entirely inapplicable to wear performance of the same alloy when used as a friction stir weld tool.

As presented herein Applicant has now identified that certain types of metal alloys can be highly useful or advantageous when used to construct a friction stir weld tool, due to highly useful or advantageous performance in terms of wear resistance. In specific, Applicant has identified that an alloy with high carbon and vanadium content (e.g., CPM-10V (also called A11) or CPM-15V)) can be used to produce a friction stir weld tool that exhibits increased wear life, for example a wear life that is at least 20 percent or at least 50 percent longer than previously used tools, when welding aluminum alloys by a friction stir welding method, e.g., at preferred friction stir weld conditions such as rotational speed (rpm), downforce, and translational speed (speed of movement of the tool along the joint to form the weld).

In one aspect, the invention relates to a method of using a friction stir weld tool to form a friction stir weld on a workpiece that includes a first metal piece and a second metal piece. The tool includes: a support body having a longitudinal axis, an outer surface centered on the axis, and a distal end having a distal face centered on the axis and extending to a distal face perimeter; a pin extending from the distal face along the axis; and a scroll pattern in the distal face. The tool is made of a metal alloy that includes iron, chromium, at least 1 or 2 weight percent carbon, and at least 6 weight percent vanadium; and the tool has a Rockwell C hardness below 65. The method includes: placing the tool in contact with the workpiece; and rotating the tool about the axis while the tool contacts the workpiece to form a friction stir weld between the first metal piece and the second metal piece.

In another aspect, the invention relates to a friction stir weld tool. The tool includes: a support body having a longitudinal axis, an outer surface centered on the axis, and a distal end having a distal face centered on the axis and extending to a distal face perimeter; a pin extending from the distal face along the axis; and a scroll pattern in the distal face. The tool is made of a metal alloy comprising: iron, chromium, at least 1 weight percent carbon, and at least 6 weight percent vanadium, and the tool has a typical Rockwell C hardness below 65.

Figure 1:
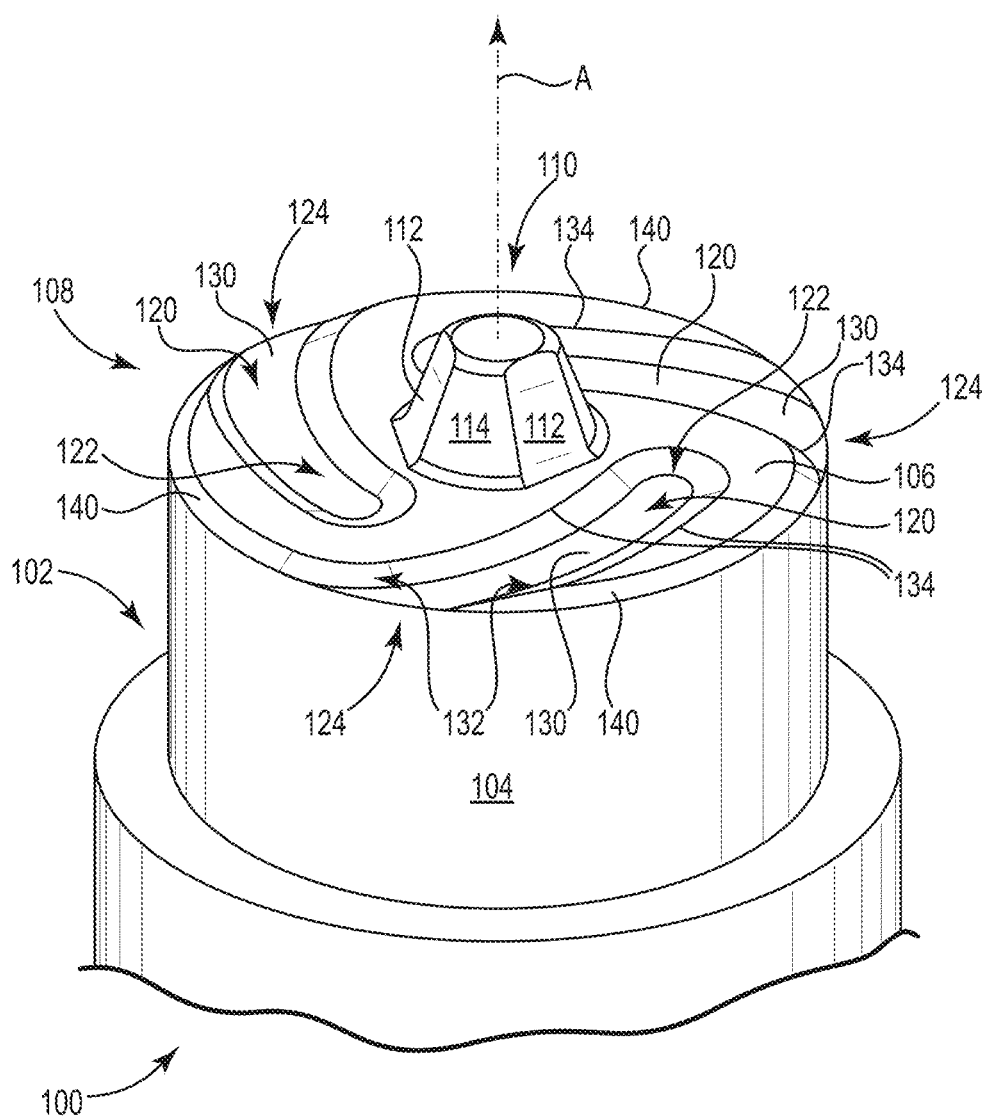
FIG. 1 shows an example of a friction stir weld tool useful in a method as described.

All drawings are schematic and not to scale.

DETAILED DESCRIPTION

As presented herein, Applicant has identified friction stir weld tools that are made of certain specific alloys that have been determined to exhibit particular performance benefits during use in the context of certain methods of friction stir welding, e.g., with particular workpieces. In specific, the novel and inventive tools can be useful or advantageous in methods of forming a friction stir weld between two metal pieces of a workpiece at a joint, using process conditions that have been identified as effective with these materials. The joint can be formed between two metal pieces, a cover and a base, with each piece being made of aluminum or aluminum alloy, and with the base being relatively thicker than the cover at the joint.

The method of forming the friction stir weld can be performed by rotating the friction stir weld tool, contacting the tool to the joint with pressure, and moving the rotating tool along the joint to form the friction stir weld. The speed of rotation of the tool (rpm) can be relatively high (rpm), with the pressure (downforce) applied by the tool to the joint being relatively low, and with the speed of movement of the rotating tool along the joint to form the joint being as desired and optionally being relatively low.

Operating within these general parameters, a useful or preferred friction stir weld tool can be one that reliably and consistently produces high quality friction stir welds, and that exhibits good wear properties so that the tool is capable of an extended working lifetime of producing friction stir welds on many hundreds of workpieces (e.g., enclosures), before the tool must be replaced.

According to the present description, a tool having desired, useful, or improved wear resistance when used as a friction stir weld tool can be made of (i.e., can have operative surfaces (e.g., at least a distal end face and adjacent support structure)) a stainless steel alloy that contains: iron, chromium, at least 1 or 2 weight percent carbon, and at least 6 weight percent vanadium. Example alloys can include from 1.5 to 4 weight percent carbon, e.g., from 2 to 3 weight percent carbon; from 2 to 7 weight percent chromium, e.g., from 3 to 6 weight percent chromium, from 0.4 to 6 weight percent molybdenum, e.g., from 1 to 4 or 5 weight percent molybdenum, and from 6 to 12 weight percent vanadium, e.g., from 7 to 10 or 11 weight percent vanadium.

A useful alloy may include low amounts of other metals such as tungsten, cobalt, nickel, titanium, and silicon, e.g., less than 6, 5, 4, 3, 2, 1, or 0.5 percent by weight tungsten; less than 10, 9, 8, 7, 6, 5, 4, 3, 2, 1, or 0.5 percent by weight cobalt; less than 5, 3, 2, 1, or 0.5 percent by weight nickel; less than 5, 3, 2, 1, or 0.5 percent by weight titanium; and less than 5, 3, 2, 1, or 0.5 percent by weight silicon.

Certain presently-useful example alloys can consist of or consist essentially of iron, carbon, chromium, molybdenum, and vanadium. An alloy that consists essentially of these materials is an alloy that contains not more than insignificant amounts of any other materials, e.g., not more than 3, 2, 1, or 0.5 weight percent (total) of other metals or additives such as tungsten, cobalt, nickel, titanium, silicon, manganese, sulfur, other common metal ingredients or impurities, or a combination of these with any other metal or additive.

The tool can have a hardness that is based on the composition of the alloy, and can be a hardness that results in desired performance characteristics of a tool as described, including the ability to produce a high-quality friction stir weld, and to prepare multiple welds over an extended lifetime, meaning that the tool has useful or advantageous wear properties as described herein. One measure of hardness is Rockwell C Hardness ("HRC" or "RC"), which refers to hardness of an alloy measured using the Rockwell C scale. Certain preferred examples of tools as described herein (e.g., at operative surfaces including the distal face and pin) can have a typical Rockwell C Hardness (HRC) that does not exceed 67, e.g., that is below 65 or below 63. Rockwell hardness is a known and measureable material property of a metal (e.g., alloy). Normal variations in a metal material's composition, heat treatment, or other processing steps (e.g. cold rolling or forging) can cause some variation in a Rockwell Hardness reading of a metal (as well as in other physical properties such as yield strength). Accordingly, a Rockwell C Hardness value of a metal material is commonly expressed as a "typical" Rockwell C Hardness. The "typical" value is the value that should be expected of a metal that is of a correct composition, and has not undergone any unusual processing steps.

A friction stir welding tool of the present description includes a support body that has an axis (e.g., a rotational or longitudinal axis), an outer surface centered on the axis, and a distal face centered on the axis and extending from the axis laterally to a distal face perimeter. A pin extends from the distal face in a direction along the axis and distally from the distal face. The distal face includes a scroll pattern that includes at least two arcuate grooves formed in the distal face. In preferred examples, each groove extends from a groove start location located between the axis and the distal face perimeter, and extends continuously to a groove end segment at the distal face perimeter.

The distal face perimeter includes arcuate "shoulder" segments that extend about the distal face perimeter between the alternating groove end segments. These shoulder segments of the perimeter connect the surface of the distal face to a distal end of the outer surface of the support body. In certain presently-preferred example tools, the distal face perimeter can include chamfered edges at the shoulder segments, as opposed to including a sharp corner along those edges.

Chamfered shoulder segments are surfaces that extend along a curved path of the distal face perimeter, and that are chamfered, meaning beveled, by cutting away the corner at the edge. The chamfered shoulder segments include an arcuate edge at a corner formed between the chamfered shoulder segment and the distal face, and a second arcuate edge at a second corner formed between the chamfered shoulder segment and the outer surface of the support body. Between the two arcuate edges is a surface that when viewed in cross section in a plane that includes the axis can be characterized as including a dimension in a direction that is parallel to the axis, i.e., in a proximal-to-distal direction, and when so viewed can be a flat (linear) surface that makes an angle with the axis. The angle formed between a line extending along that surface and the axis can be any angle that is useful to provide a desired chamfer as described, in a useful tool, including example angles in a range from 30 to 60 degrees.

An example of a tool as described, made of an alloy as described, is shown at FIG. 1. As illustrated, tool 100 includes support body 102 that has a longitudinal axis (A), outer surface 104 centered on the axis, and distal face 106 centered on the axis and extending from the axis laterally to perimeter 108 of distal face 106 and support body 102. Pin 110 extends from distal face 106 in a direction along the axis and distally from distal face 106.

Distal face 106 includes a scroll pattern that includes at least two arcuate (when viewed in a direction of axis A) grooves 120 formed in distal face 106. Each groove 120 extends from a groove start location 122 located between the axis and perimeter 108, to a groove end segment 124 at perimeter 108. A depth (i.e., cross-sectional profile) of each groove in distal face 106 may be shaped as desired, with useful or preferred grooves having a maximum depth in a range from 0.05 to 0.5 millimeters relative to the surface of distal face 106. Preferred grooves can have a shape (when viewed in cross section in a plane that includes the axis) that includes a bottom 130 (at a maximum depth of the groove) and sidewalls 132 that extend from bottom 130 to opposed distal (e.g., upper) edges 134 of each groove 120, where each groove 120 meets distal face 106 at a cornered edge. The shape of preferred grooves can include sidewalls 132 that are curved or angled relative to the direction of axis A, i.e., not parallel to axis A. For example, sidewalls 132 can be curved, or, preferably chamfered in a manner and at an angle that is similar to or the same as an angle of chamfered shoulder segments 140 of the tool. In cross section, a useful or preferred chamfered sidewall can have a surface that is considered to extend along a line that is non-parallel to the axis, for example along a line that forms an angle with the axis that is in a range from 30 to 60 degrees. Curved or chamfered sidewalls 132 differ from sidewalls that are vertical, meaning sidewalls that extend in a direction that is parallel to axis A.

As illustrated, tool 100 includes three chamfered shoulder segments 140 that extend along perimeter 108 between three groove end segments 124. Each chamfered shoulder segment 140 extends along perimeter 108 between two adjacent groove end segments 124. Each chamfered shoulder segment 140 includes a surface that connects and extends between distal face 106 and a distal end of outer surface 104 of support body 102, with each surface extending in a direction that includes a directional component that is the parallel with the axis. In cross section in a plane of the axis, each chamfered shoulder segment surface can be considered to extend along a line that is non-parallel to the axis, for example along a line that forms an angle with the axis that is in a range from 30 to 60 degrees.

Pin 110 can have any structure, shape, or form that will provide desired performance of tool 100 when used for friction stir welding. Useful and preferred examples of shapes of pin 110 can include multiple outer surfaces (e.g., sidewalls) that include three or more facets 112, which are flat or planar surfaces that can preferably be oriented to be non-parallel to axis A. Facets 112 may be connected to adjacent facets or may optionally be interrupted by rounded portions 114 (as illustrated at FIG. 1). The number of facets on a pin can be as desired and useful, e.g., at least 3, and up to 5, 6, 8, or more. Distal pin end (the portion of pin 110 that is farthest away from distal face 106) of pin 110 can be flat and planar, i.e., perpendicular relative to axis A (see FIG. 1), or (see FIGS. 2A, 2C, and 2D) may be cornered, angular, or substantially sharp, e.g., if formed by an intersection of facets 112.

Specific dimensions of a tool as described can be any that are useful for forming a friction stir weld. Useful sizes of a support body (e.g., diameter at a distal face), distal face, grooves, and pin of a tool can be effective for forming high quality friction stir welds. According to certain embodiments of tools of the present description, size features of a useful tool may be relatively small, which may allow a tool to be useful to form friction stir welds with potentially advantageous operating parameters, for example by use of a relatively higher tool rotational speed (rpm), relatively higher translational speed, reduced downforce, or a combination of these.

In additional detail, useful dimensions of a support body and pin may be ones that are capable of being used to form a desired friction stir weld, with dimensions of any particular tool being selected based on factors that include the type and dimensions (e.g., thickness) of a workpiece, the desired size dimensions (width and depth) of a friction stir weld that is being formed, and desired or preferred operating parameters such as rotational speed (rpm), translational speed, and downforce during friction stir welding. For a tool that is capable of preferred uses that include forming a friction stir weld from a relatively thin workpiece, or for use in a friction stir welding process that includes one or more of a relatively high rotational speed (rpm), relatively high translational speed, or relatively low downforce, certain relatively smaller dimensions of features of a tool can be preferred, such as a relatively small diameter of the support body, a relatively short length of a pin, and a relatively small diameter of the pin. According to such embodiments, a diameter of a support body at or near a shoulder may be less than about 10 millimeters, e.g., in a range from 2 to 10 millimeters, such as from 3 to 4 or 3 to 5 millimeters. Also according to these embodiments, a length of the pin may be a length that is sufficient to form a weld of a desired depth; when working with a relatively thin workpiece, e.g., a thin cover, a length of an example pin may be in a range from 0.2 to 1.5 millimeters, e.g., from 0.2 to 0.6 or 0.8 millimeters. A diameter of the pin for such embodiments, measured at a base of the pin located at a connection of the pin to the distal face, may be in a range from 0.5 to 1.5 millimeters.

A tool of the present description can be manufactured by any useful method of forming, shaping, and processing (e.g., hardening) a metal piece intended to be useful for a purpose of cutting, milling, friction stir welding, or machining another piece of metal. Specific examples of useful methods include milling and CNC (computer numerical control) machining of a larger block of metal to form the tool.

While the methods and tools of the present description can be useful for forming a weld on any two metal pieces, certain particular embodiments of the invention relate to methods for forming a friction stir weld on a workpiece that is an assembly of two metal pieces that include a base and a cover, that fit together to form an enclosure for an electronic device. In such an assembly, the base and cover can be assembled with the cover over the base, with surfaces of the cover and base forming a joint at which a friction stir weld can be produced. Example enclosures can be useful as part of an electronic device, for example a hermetically sealed hard disk drive, a solid state memory device, a semiconductor device, or a general computing device such as a personal (desktop) computer, cell phone, tablet, laptop, or the like.

An example assembly can be a hermetically-sealed enclosure of an electronic device, e.g., a hermetically-sealed hard disk drive as primarily described herein. Desirably as a feature of a useful or preferred enclosure or electronic device, an interior of an enclosure can include a low density atmosphere. During preparation of an assembly, an interior of the assembly can be filled with an atmosphere of low density gas to displace air within the interior and to provide a low density (relative to air) atmosphere at the interior of the enclosure. An atmosphere of concentrated helium (e.g., 80, 90, 95 percent helium), for example, is one useful type of low density atmosphere. With the un-welded assembly containing the low density atmosphere, the assembly can be processed by forming a friction stir weld along an entire length of a joint formed between the cover and the base, meaning around the entire perimeter of the assembly. The friction stir weld can be effective to hermetically seal the enclosure and contain the low density gas inside of the enclosure while preventing other gases at an exterior of the enclosure from entering the enclosure. Example hermetically sealed enclosures that include the friction stir weld can allow for not more than a very low rate of leakage from the enclosure, for example a rate of leakage that is less than 1 percent of a volume of atmosphere (gas) present within the enclosure per year. Examples of hard disk drives that include a base and a cover and that are hermetically sealed to contain a low density atmosphere are described in U.S. Pat. No. 9,536,572, the entirety of which is incorporated herein by reference. See also U.S. Pat. No. 8,279,552, describing a hermetically sealed hard disk.

In example friction stir welding methods as described, for welding a cover to a base to produce a friction stir joint that functions as a hermetic seal, the base has a vertically-extending sidewall that includes a shoulder at an outer surface of the sidewall between a top and a bottom of the sidewall. The cover includes a top planar portion and a vertically-extending lip. The lip extends along the outer surface of the sidewall of the base when the two pieces are assembled. The lip end portion contacts the shoulder of the sidewall to form a joint, which is a location of formation of a friction stir weld. The thickness of the cover at the lip is approximately equal to the thickness of the sidewall at the shoulder, above the horizontal shoulder surface. The thickness of the cover lip at the joint is preferably approximately equal to a width of a horizontal shoulder surface of the sidewall at the joint.

The base generally includes a space or cavity defined by a horizontal (flat, planar) bottom that includes a perimeter, and by a vertically-extending sidewall that extends from the base around the entire perimeter of the base in a vertical direction relative to the horizontal bottom. The sidewall extends continuously about the entire perimeter of the base and includes an upper sidewall, a lower sidewall, a sidewall top, and a horizontally-extending shoulder surface that extends horizontally from the sidewall at a location that is vertically between the top and the bottom of the sidewall along the height of the sidewall. The shoulder extends horizontally from the outer sidewall surface and continuously around the entire perimeter of the base. The horizontal surface of the shoulder connects to the lower portion of the upper sidewall at an interior shoulder corner, and connects to an upper portion of the lower sidewall at an exterior shoulder corner. With the cover and the base in an assembled condition, the shoulder engages a lower end portion of the lip of the cover. At that engagement, the lower end portion of the lip forms a joint with the shoulder that extends continuously around the enclosure at the perimeter of the enclosure. As described herein, a friction-stir weld can be formed at the joint, around the entire perimeter of the assembly, to produce a hermetic seal that extends entirely around the perimeter of the base and the cover.

The sidewall can be any useful or desired height, measured vertically from the bottom of the base to the top surface of the sidewall. A useful or preferred range for a height of a sidewall for a presently-useful hard disk drive device can be in a range from 20 to 30 millimeters, e.g., from 22 to 28 millimeters.

The sidewall has a thickness that extends horizontally from an outer sidewall surface to an inner sidewall surface that defines the base cavity. The thickness of the sidewall can vary along the height of the sidewall, such as by being thicker (having a greater thickness) at a lower portion of the sidewall, and being less thick (having a smaller thickness) at an upper portion of the sidewall. The sidewall top is the uppermost surface of the sidewall, which may typically include a horizontal orientation and have a thickness in a horizontal direction. A thickness at the top and bottom of the sidewall can preferably be at least about 1 millimeter, e.g., at least 1 millimeter. A presently-useful example of a sidewall can have a thickness at a location of formation of a friction stir weld that is equal to or greater than a thickness at the top of the sidewall, i.e., a greater thickness at a location of the joint, which is the location at which a friction stir weld will be formed. A greater thickness at the location of the friction stir weld will provide a desired level of strength and support during the friction stir weld process. An example of a thickness of the sidewall at a location of a friction stir weld can be at least 1 millimeter, e.g., in a range from 2 or 3 to 5 or 7 millimeters (measured, for example, just above the horizontally-extending shoulder surface). An example of a thickness of the sidewall at a lower (e.g., bottom) location of the sidewall can be at least 2 millimeters, e.g., in a range from 3 or 4 up to about 5, 7, or 8 millimeters (measured, for example, just above the bottom of the base cavity, where the sidewall meets the bottom of the base cavity).

The base may be constructed of any useful metal material and may have any general or specific form consistent with the present description. Example base structures may be made of a metal alloy such as an aluminum alloy, for example a 5000 series or 6000 series aluminum alloy. The base structure can be of any useful form, such as being composed of a single integral piece or two or more pieces that are secured (e.g., welded) together. The process for preparing the base may be any, as desired, such as by being forged, extruded, cast, machined, stamped, etc.

The cover includes a horizontal (flat, planar) top portion and a lip that extends from the perimeter of the horizontal portion in a vertical (downward) direction relative to the horizontal top portion. The cover may be constructed of any useful aluminum material (aluminum or aluminum alloy) for example a 4000 series or 6000 series aluminum alloy, may have any general or specific form consistent with the present description, and may be prepared (as a single example) by stamping and by a non-hem (or "zero-hem") method of trimming the lower end of the lip. A zero-hem edge may be formed by known methods and equipment, such as with a cammed cut-off die. Other edge treatments that may or may not produce a zero-hem edge may also be useful.

A thickness of a cover as described, i.e., a thickness in a z-dimension (in a height direction) of the top portion of a cover, alternately a thickness in an x- or y-dimension measured at the lip, may be within a useful range that is sufficiently thick to allow for desired friction stir welding of the cover to the base, without being unnecessarily thick. A preferred cover material may be relatively thin, because a thinner cover material can allow for a larger interior space within an enclosure formed from the cover, meaning a larger space for interior items such as magnetic recording disks. However, a thinner cover material may be more difficult to process by friction stir welding compared to a relatively thicker cover material, because relatively thinner materials are more prone to buckling and tearing. Thus, Applicant has determined that a thickness of a cover can be sufficiently large to allow for friction stir welding as described herein, but held to a low or minimum thickness to allow for a greater amount of interior space of an enclosure that includes the cover. A range of thicknesses that can be useful or preferred is in a range from 10 mils to 40 mils. Preferably, the entire cover, including the vertically-extending lip along the perimeter of the cover, as well as the flat upper portion, has a thickness that is relatively uniform and in a range from 10 mils thick to 40 mils thick. In preferred examples of assemblies as described, a thickness of a horizontal shoulder surface that engages a lip end portion at a joint can also be within this range and can be approximately equal to the thickness of the lip at the lip end portion.

Figure 2A:
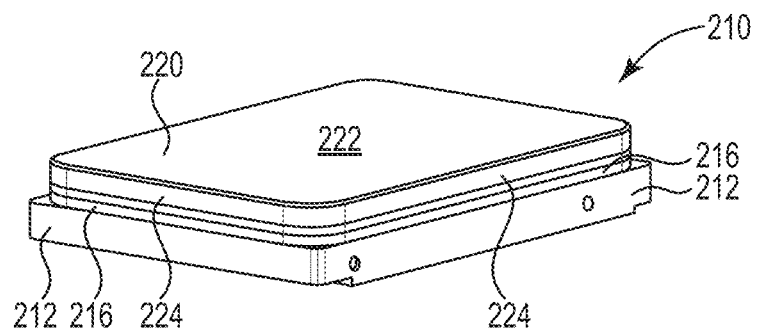
FIGS. 2A and 2B are side perspective and side cross-section (respectively) views of an assembly of the present description in the form of an enclosure that includes a base and a cover.
Figure 2B:
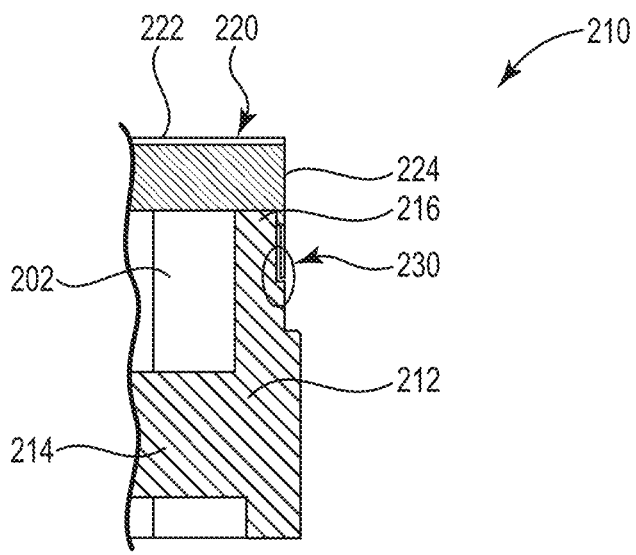

A single example of this type of workpiece is shown at FIGS. 2A and 2B, which specifically show an example of an electronic device, e.g., hard disk drive 210, that includes an enclosure made of base 212, cover 220, and that includes interior (cavity) 202. Base 212 includes a horizontally-extending bottom 214 having a perimeter from which sidewalls 216 extend in an upward vertical direction (i.e., at least substantially or approximately vertical with reference to horizontally-extending bottom 214). Cover 220 includes horizontally-extending top portion 222 having a perimeter from which extends lip 224 in a downward vertical direction (i.e., at least substantially or approximately vertical with reference to horizontally extending top portion 222). A lower end of lip 224 meets sidewall 216 at joint 230, shown before a weld is formed at the joint.

Methods of friction stir welding two pieces of a workpiece, e.g., at a joint between a cover and a base as described, can be performed by rotating a friction stir welding tool of the present description and contacting the rotating tool, with pressure, to the workpiece at the joint. The tool rotating in contact with the workpiece generates heat to soften and allow for flow and mixing of the materials of the workpiece. Specifically, the rotating tool heats and mechanically mixes and joins the heated materials using mechanical pressure to soften the materials, while the rotating pin is effective to mix the softened materials. In preferred embodiments, a depth of the friction stir weld is at least as deep as the thickness of one or both pieces that make up a workpiece, preferably at least 5 or 10 percent greater than a thickness of one or both materials of the workpiece, e.g., a cover.

Figure 3:
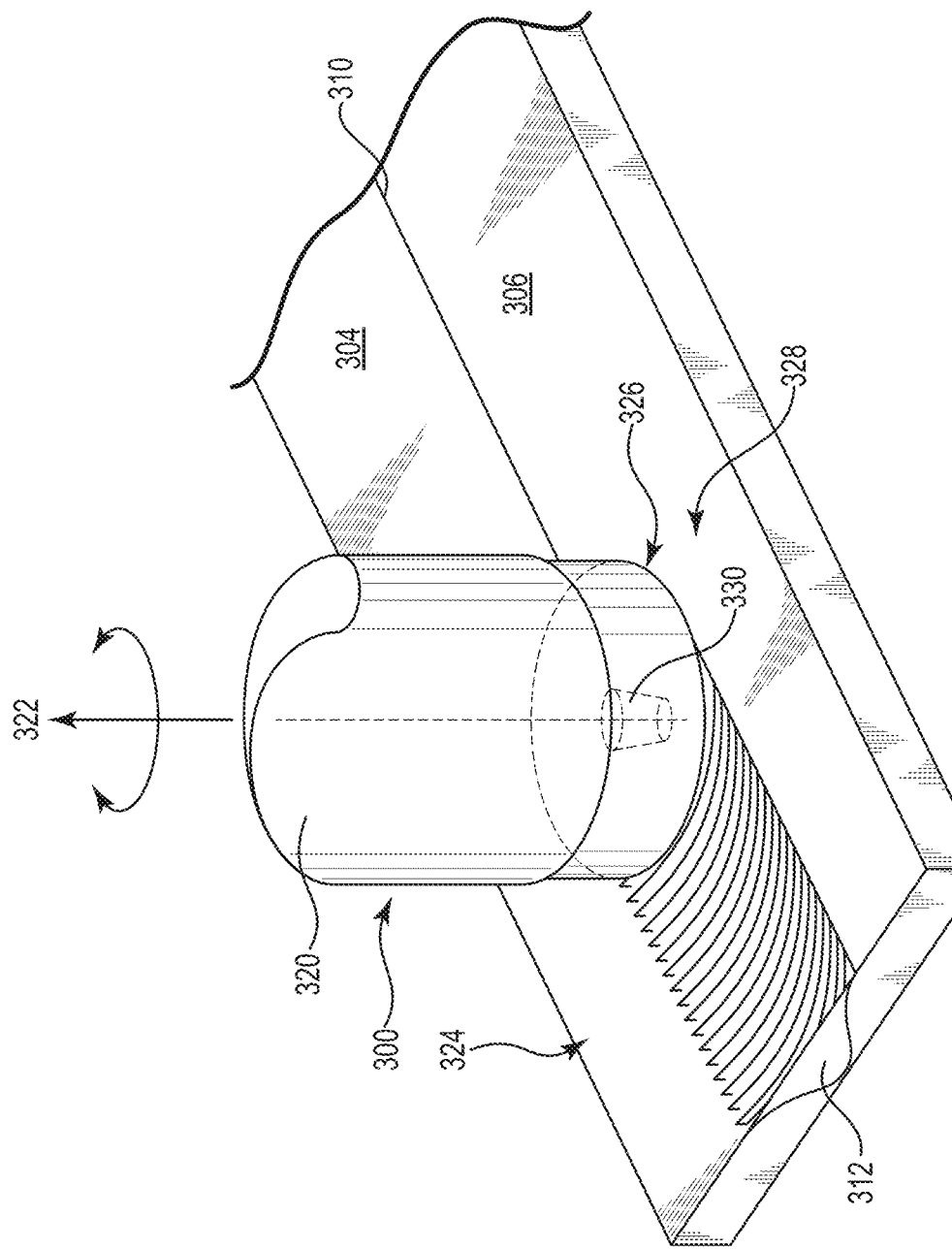
FIG. 3 illustrates an example of a method as described.

Referring to FIG. 3, a method of friction stir welding a joint as described can be performed by providing a tool 300 for forming a friction stir weld and rotating the tool, while contacting and applying pressure to joint 310, to form a friction stir weld 312. A first metal component 324, e.g., a base, and a second metal component 306, e.g., a cover, meet at adjacent edges to form joint 310 as described herein. Tool 300 includes support body 320 having longitudinal axis 322 and distal end 324. Shoulder 326 at distal end 324 includes distal face 328 (held against a top surface of joint 310) adapted to contact surfaces of components 324 and 306 at joint 310 during friction stir welding. Distal face 328 is centered on axis 322 and extends laterally to a perimeter at shoulder 326 centered on the axis. Extending in a distal direction from distal face 328, along axis 322, is pin 330, which extends into first and second metal components 324 and 306 at joint 310 during friction stir welding.

During formation of friction stir weld 312 along a length of a joint 310, distal face 328 of tool 300 is placed in contact with surfaces of components 324 and 306 at joint 310. Pressure from tool 300 is applied to joint 310 as tool 300 is rotated to soften materials of metal components 324 and 306. As tool 300 moves along joint 310, friction stir weld 312 is formed.

Parameters of a useful step of forming a friction stir weld can be any that are useful to produce a desired friction stir weld. Examples of parameters that can be selected and controlled include rotation speed of the tool, downforce of the tool against the workpiece, speed of the tool along the length of the joint (i.e., speed of forming the weld in a length-wise direction, also referred to as translational speed), angle of the tool relative to the workpiece (e.g., from 1 to 10 degrees), as well as dimensions of the tool itself such as the diameter of the tool at the shoulder (distal face) and the diameter and length of the pin (pin length being measured along the axis of the tool from the distal face).

A diameter of the tool at the shoulder (i.e., a maximum diameter at the distal face) can approximate a width of a friction stir weld that is formed. Any diameter can be used that will provide a weld that has sufficient strength, and that will be useful for efficiently preparing a friction stir weld as described. Examples of diameters of a tool at the shoulder, and corresponding widths of a friction stir weld, may be less than about 10 millimeters, e.g., in a range from 2 to 10 millimeters, such as from 3 to 4 millimeters, or from 3 to 5 millimeters.

A depth of a friction stir weld will typically be slightly greater than a length of a pin extending from the distal face of a tool used to form the weld. A desired depth of a weld as described herein is at least as deep as, preferably deeper than, the thickness of the lip end and the width of the shoulder at a joint at which the weld is formed (see, e.g., FIG. 2B and related text). To form a weld of this depth, the length of the pin should be at least as long as the thickness of the lip (at the joint) and at least as long as the width of the shoulder (e.g., a width of horizontal shoulder surface), preferably at least 5, 10, 20, or 30 percent greater than one or both of those dimensions. According to certain embodiments of tools and friction stir weld methods, a length of a pin can be in a range from 0.2 to 1.5 millimeters. A diameter of the pin, measured at a base of the pin located at a connection of the pin to the distal face, can be any useful diameter, such as a diameter in a range from 0.5 to 1.5 millimeters.

During formation of the weld, the tool can be rotated at a speed that is useful to add sufficient energy to the two metal components of a joint to soften the metal components and allow mixing of the metal components by the tool. Useful and preferred rotational speeds of a tool to form a friction stir weld as described can be at least 1,000 revolutions per minute (rpm), e.g., at least 2,000 rpm, or at least 6,000, 8,000, or 12,000 rpm, and up to about 30,000 rpm.

During formation of the weld, the tool, i.e., at the distal face, can apply a downforce to the two metal components at the joint in a direction along the axis of the tool. Any amount of downforce can be used that will be effective in forming a desired weld in an efficient manner. Examples of a useful downforce may be less than about 1,000 newtons, e.g., less than 500 newtons.

During formation of the weld a tool may be moved along a joint in a lengthwise direction at any useful speed, preferably a speed that will efficiently form a high quality weld. Examples of useful speeds of a tool along a joint during formation of a friction stir weld can be in a range from about 0.1 to 3 meters per minute (e.g., from about 1.6 to 50 millimeters per second).

EXAMPLES

Applicant performed experiments to assess wear properties of various stainless steel alloys when formed into a friction stir weld tool, including example alloys that may be expected to exhibit good wear resistance due to the presence of added metals such as chromium, tungsten, molybdenum, vanadium, cobalt, nickel, and titanium. For use in friction stir welding aluminum workpieces, H13 tool steel is a common alloy used in a pin tool. Other less common materials include Ni/Co alloys such as MP-159 and PM-60, carbides, tungsten alloys, titanium alloys, among others.

Table 1 below shows examples of alloy compositions and test results that indicate relative levels of wear resistance. Generally, tools made of the listed alloys were used to form friction stir welds between an aluminum cover and an aluminum base as described herein, using a relatively high rotational speed of the tool, a relatively low downforce, and a relatively slow translational speed, also as described herein. After forming a number of friction stir welds each tool was analyzed to assess the degree to which each tool showed signs of wear.

TABLE 1

| High speed steel | Carbon C | Chromium Cr | Tungsten W | Molybdenum Mo | Vanadium V | Cobalt Co | Nickel Ni | Titanium Ti | Silicon Si | Typical HrC | AV (mm$^3$) | Depth (mm) |
|---|---|---|---|---|---|---|---|---|---|---|---|---|
| H13 | 0.40 | 5.25 | — | 1.35 | 1.00 | — | — | — | 1.00 | 50 | 41 | −1.21 |
| PM60 | 2.30 | 4.20 | 6.50 | 7.00 | 6.50 | 10.50 | — | — | — | 67 | −2302 | −2.34 |
| PMM4 | 1.40 | 4.0 | 5.65 | 5.20 | 4.00 | — | — | — | — | 65 | | |
| M4 | 1.30 | 4.25 | 5.85 | 4.75 | 4.10 | — | — | — | — | 65 | −1045 | −1.87 |
| 10 V | 2.45 | 5.25 | — | 1.30 | 9.75 | — | — | — | 0.9 | 60 | 422 | 0.98 |
| MP159 | — | 19.0 | — | 7.0 | — | 35.7 | 25.5 | 3.0 | 3.0 | 40 | Didn't work well | |
| T15 | 1.6 | 4.0 | 12.25 | — | 4.9 | 5.0 | — | — | — | 66 | −1619 | −1.76 |

Other materials may be present in small amounts, e.g., not more than about 0.5 weight percent, such as sulfur or manganese.

A first measured indication of wear resistance is a measurement of a loss of material that occurs from a tip of a pin tool after multiple uses of the tool during friction stir welding (shown at Table 1 as "$\Delta V$" in units of cubic millimeters ($mm^3$)). To perform this test, an initial volume of a tip of a pin tool was measured using a scanning laser microscope. The pin tool was then used to complete 100 friction stir welds. The volume of the tip of the pin tool was then re-measured and the second measured volume was subtracted from the initial volume to calculate a wear volume. Note that the values of the volume change in some instances are positive, which indicates an apparent increase in volume (which is not occurring) instead of a decrease in volume. This result is due to the method of measuring the volumes of the pins and merely means that the measured values of material "loss" are not absolute, but are relative. The relative differences of volume loss measured from each of the tools of different alloys are useful to compare wear properties of the tools of the different alloys. A higher reported value in the volume loss column of Table 1 (e.g., positive 422 for alloy 10V) indicates a lower amount of volume lost at the pin, compared to a lower reported value (e.g., a negative value, such as a highly negative value of −2303 for PM60). A lower amount of volume lost (a negative value of a lower magnitude, or a positive value) indicates greater wear resistance.

Figure 4A:
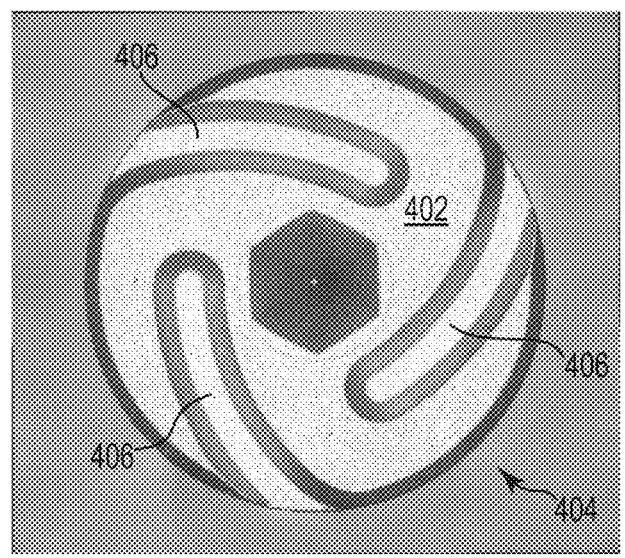
FIGS. 4A and 4B are photographs of tools as described, comparing a surface of a tool that is un-used, to a surface of a tool that has been used over multiple friction stir weld cycles.
Figure 4B:
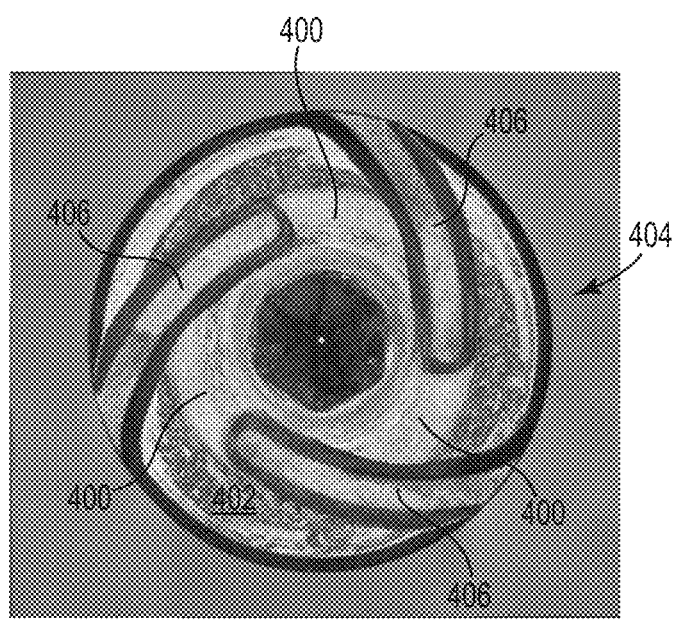

A second measured indication of wear resistance is a measurement of a depth of a groove that forms in the distal face of a pin tool after multiple uses of the tool for forming a friction stir weld (i.e., "wear groove depth," shown at Table 1 as "depth" in units of millimeters (mm)). During friction stir welding, a wear groove can form along a path that follows a trailing end of a groove in a distal face of a friction stir weld tool. Referring to FIGS. 4A and 4B (photographs), wear grooves 400 are shown on face 402 of friction stir weld tool 404. FIG. 4A shows a distal face of tool 404 made of alloy PM60, before the tool has been used to form any friction stir welds; no wear grooves are present. FIG. 4B shows the same tool after the tool has been used to form 100 friction stir welds; wear grooves 400 are shown, and have the form of a groove formed in face 402 along an arcuate path behind grooves 406 (grooves 406 are comparable to grooves 120 of FIG. 1).

To measure wear groove depth the pin tool was used to complete 100 friction stir welds. The depth of a wear groove was then measured as a difference between levels of measurements taken at face 402 at non-groove (400) locations, versus measurements taken at bottom levels of grooves 400. Note that the value of the depth in one instance (10V) is negative, which apparently indicates an increase in the height of the surface at the wear groove as opposed to a deceased height and formation of a groove. This result is due to the method of measuring the level of the surface of the distal face, and merely means that the measured values of groove depth are not absolute, but relative. The relative differences are useful to compare wear properties of the different alloys.

The data of Table 1 show that the 10V alloy performs substantially better in a friction stir weld tool, compared to other alloys, in terms of wear resistance measured both as a change in volume of the pin and as a depth of a groove formed during friction stir welding. These results were contrary to expectations. Alloy H13 of Table 1 was selected for testing because it is common in friction stir welding tools. Each of the other alloys of Table 1 was selected for testing as a friction stir weld tool based on its composition, which was considered to potentially result in good wear resistance, e.g., improved relative to the wear resistance of the H13 alloy. To the contrary, all alloys other than 10V exhibited reduced wear resistance compared to the H13 as measured in terms of lost volume at the tip and as measured in terms of a groove depth.

Figure 5A:
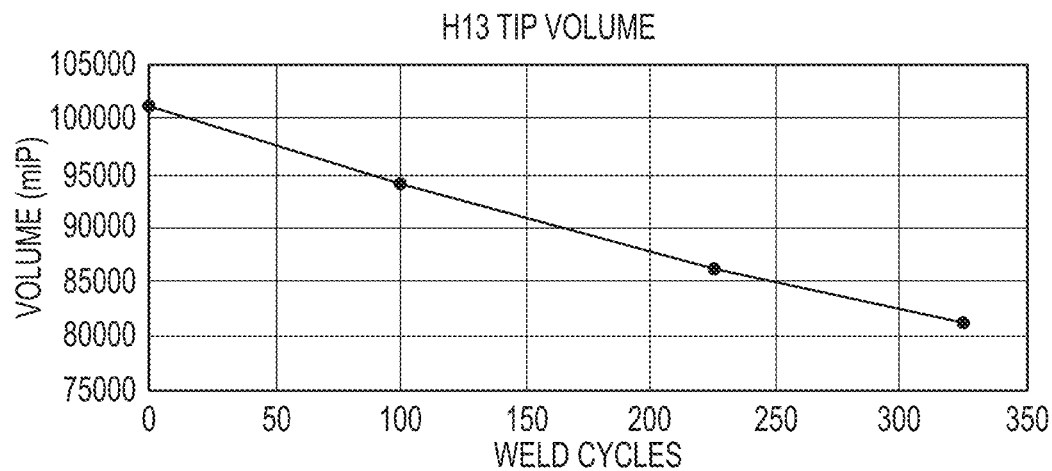
FIGS. 5A and 5B are graphs that contain wear resistance data of a tool of the invention to a non-inventive tool.
Figure 5B:
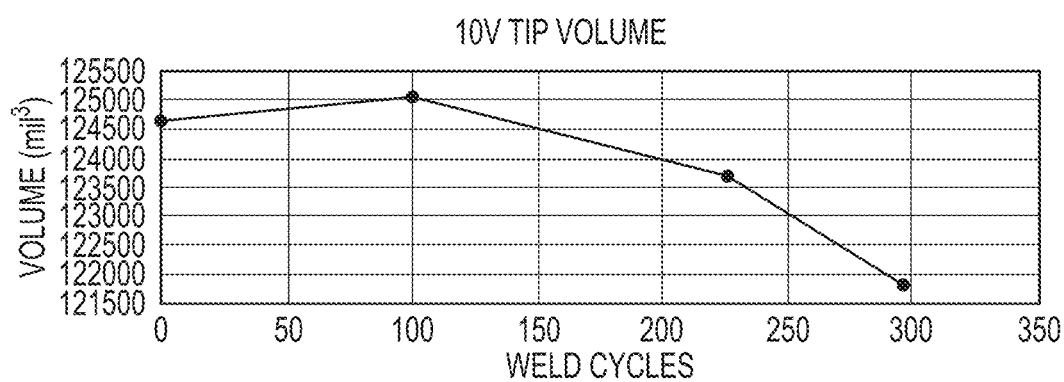

Referring to FIG. 5A, the graph shows data of tip volume of a tool made with alloy H13 over a large number of friction stir weld cycles. Comparing that data to the data of FIG. 5B, showing changes in tip volume of a tool made with alloy 10V over a large number of friction stir weld cycles, shows a significant improvement in the wear resistance of the tool of the 10V alloy relative to the tool of the H13 alloy, measured by a change in tip volume.

Figure 6:
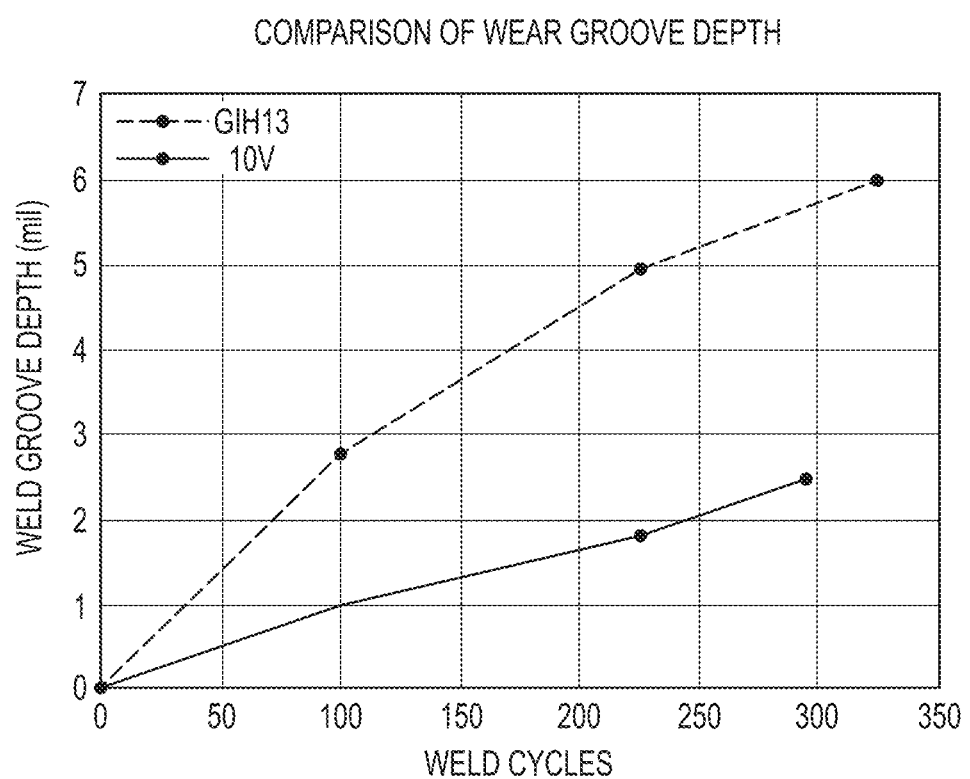
FIG. 6 is a graph that contains wear resistance data of a tool of the invention to a non-inventive tool.

Referring to FIG. 6, the graph shows data of groove depth that occurs in tools made with alloy H13, and with alloy 10V, over a large number of friction stir weld cycles. Comparing that data shows a significant improvement in the wear resistance of the tool of the 10V alloy (lower line) relative to the tool of the H13 alloy (upper line), measured in terms of groove depth that occurs with many friction stir weld cycles.

The invention claimed is:

1. A method of using a friction stir weld tool to form a friction stir weld on a workpiece that includes a first metal piece and a second metal piece,
   the tool comprising:
      a support body having a longitudinal axis, an outer surface centered on the axis, and a distal end having a distal face centered on the axis and extending to a distal face perimeter,
      a pin extending from the distal face along the axis, and
      a scroll pattern in the distal face,
   the tool being made of a metal alloy comprising: iron, chromium, at least 1 weight percent carbon, and at least 6 weight percent vanadium,
   the tool having a typical Rockwell C hardness below 65,
   the method comprising:
      placing the tool in contact with the workpiece, and
      rotating the tool about the axis while the tool contacts the workpiece to form a friction stir weld between the first metal piece and the second metal piece
   wherein the first metal piece is an aluminum base and the second metal piece is an aluminum cover, and the workpiece is an enclosure that includes the cover placed over the base,
   the base comprising:
      a horizontal bottom and a base cavity defined by the bottom and vertical base sidewalls at a base perimeter,
      an outer sidewall surface extending along the base perimeter that includes a shoulder, an upper sidewall surface above the shoulder, and a lower sidewall surface below the shoulder, the shoulder comprising a lower portion of the upper sidewall surface connecting to a horizontal shoulder surface at an interior shoulder corner, the horizontal shoulder surface extending horizontally from the interior shoulder corner to an exterior shoulder corner, and an upper portion of the lower sidewall surface extending vertically from the exterior shoulder corner;
   and the cover is located over the base to enclose the base cavity, the cover including a horizontal top portion extending over the base and a lip at a cover perimeter, the lip extending in a vertical direction relative to the horizontal top portion, the lip including a lower lip portion that contacts the shoulder to form a joint when the cover is installed over the base.

2. A method of claim 1 wherein the metal alloy comprises:
from 2 to 4 weight percent carbon,
from 2 to 7 weight percent chromium,
from 0.4 to 5 weight percent molybdenum, and
from 6 to 12 weight percent vanadium.

3. A method of claim 1 wherein the metal alloy comprises:
less than 6 percent by weight tungsten,
less than 10 percent by weight cobalt,
less than 3 percent by weight nickel,
less than 3 percent by weight titanium,
less than 3 percent by weight silicon.

4. A method of claim 1 wherein the metal alloy comprises:
less than 0.5 percent by weight tungsten,
less than 0.5 percent by weight cobalt,
less than 0.5 percent by weight nickel,
less than 0.5 percent by weight titanium,
less than 0.5 percent by weight silicon.

5. A method of claim 1 wherein the scroll pattern comprises multiple arcuate grooves in the distal face, each groove extending from a groove start location located between the axis and the distal face perimeter, to a groove end segment at the distal face perimeter.

6. A method of claim 1 comprising rotating the tool at a speed in a range from 1,000 to 30,000 revolutions per minute.

7. A method of claim 1 comprising, during forming the friction stir weld, applying downforce in a direction of the axis from the tool to the workpiece, the downforce being less than 1,000 newtons.

8. A method of claim 1 comprising, during forming the friction stir weld, moving the tool along the joint at a speed that is in a range from 0.1 to 3 meters per minute.

9. A method of claim 1 wherein the first metal piece is aluminum and has a first thickness in a direction of the axis, and the second metal piece is aluminum and has a second thickness in the direction of the axis, and the first thickness is less than the second thickness.

10. A method of claim 9 wherein the first thickness is in a range from 10 to 40 mils.

11. A method of claim 1 wherein a width of the friction stir weld in a range from 2 to 10 millimeters.

12. A method of claim 1 wherein
the distal face perimeter has a diameter in a range from 2 to 10 millimeters, or
the pin has a length along the axis in a range from 0.1 to 1.5 millimeters,
or both.

13. A method of claim 1 wherein the tool exhibits improved wear resistance relative to a comparable tool having the same structure but being made of an alloy that contains less than 6 percent vanadium.

* * * * *